(12) United States Patent
Koo

(10) Patent No.: US 10,838,858 B2
(45) Date of Patent: Nov. 17, 2020

(54) CONTROLLER AND OPERATING METHOD OF THE SAME

(71) Applicant: SK hynix Inc., Gyeonggi-do (KR)

(72) Inventor: Joon-Mo Koo, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 289 days.

(21) Appl. No.: 15/902,442

(22) Filed: Feb. 22, 2018

(65) Prior Publication Data

US 2019/0026224 A1 Jan. 24, 2019

(30) Foreign Application Priority Data

Jul. 19, 2017 (KR) .......................... 10-2017-0091516

(51) Int. Cl.
*G06F 12/02* (2006.01)
*G06F 3/06* (2006.01)
*G06F 9/4401* (2018.01)

(52) U.S. Cl.
CPC .......... *G06F 12/0253* (2013.01); *G06F 3/064* (2013.01); *G06F 3/0608* (2013.01); *G06F 3/0652* (2013.01); *G06F 3/0679* (2013.01); *G06F 9/4406* (2013.01); *G06F 12/0246* (2013.01); *G06F 12/0238* (2013.01); *G06F 2212/1032* (2013.01); *G06F 2212/7201* (2013.01); *G06F 2212/7205* (2013.01)

(58) Field of Classification Search
None
See application file for complete search history.

(56) References Cited

U.S. PATENT DOCUMENTS

| | | | | |
|---|---|---|---|---|
| 7,610,437 | B2* | 10/2009 | Sinclair | G06F 3/0605 711/103 |
| 2007/0033378 | A1* | 2/2007 | Sinclair | G06F 3/0605 711/203 |
| 2014/0310499 | A1* | 10/2014 | Sundararaman | G06F 16/2308 711/203 |

FOREIGN PATENT DOCUMENTS

| | | |
|---|---|---|
| KR | 1020150045747 | 4/2015 |
| KR | 1020150053092 | 5/2015 |
| KR | 1020150130638 | 11/2015 |
| KR | 1020160027805 | 3/2016 |

\* cited by examiner

*Primary Examiner* — Brian R Peugh
(74) *Attorney, Agent, or Firm* — IP & T Group LLP

(57) ABSTRACT

A controller comprising: a scheduling unit suitable for scheduling a garbage collection recovery operation to be performed in a runtime state after end of abnormal situation using first and second operation logs; a scanning unit suitable for scanning a destination block to detect one or more valid pages during the garbage collection recovery operation; and a map updating unit suitable for updating L2P mapping information of the detected valid pages, wherein the first operation log indicates a location of a valid page, into which source block data is most recently copied, in a destination block, and wherein the second operation log indicates a location of a valid page, L2P mapping information of which is most recently updated, in the destination block.

21 Claims, 12 Drawing Sheets

CONTROLLER AND OPERATING METHOD OF THE SAME

CROSS-REFERENCE TO RELATED APPLICATIONS

The present application claims priority of Korean Patent Application No. 10-2017-0091516, filed on Jul. 19, 2017, which is incorporated herein by reference in its entirety.

BACKGROUND

1. Field

Exemplary embodiments of the present invention relate to a controller, and more particularly, to a controller capable of supporting garbage collection recovery, and a method for operating the controller.

2. Description of the Related Art

The computer environment paradigm has changed to ubiquitous computing systems that can be used anytime and anywhere. Due to this fact, use of portable electronic devices such as mobile phones, digital cameras, and notebook computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts. Examples of memory systems having such advantages include universal serial bus (USB) memory devices, memory cards having various interfaces, and solid state drives (SSD).

SUMMARY

Embodiments of the present invention are directed to a controller capable of saving booting time by performing garbage collection recovery operation during runtime, and a method for operating the controller.

In accordance with an embodiment of the present invention, a controller including: a scheduling unit suitable for scheduling a garbage collection recovery operation to be performed in a runtime state after end of abnormal situation using first and second operation logs; a scanning unit suitable for scanning a destination block to detect one or more valid pages during the garbage collection recovery operation; and a map updating unit suitable for updating L2P mapping information of the detected valid pages, wherein the first operation log indicates a location of a valid page, into which source block data is most recently copied, in a destination block, and wherein the second operation log indicates a location of a valid page, L2P mapping information of which is most recently updated, in the destination block.

In accordance with another embodiment of the present invention, a method for operating a controller, the method including: scheduling a garbage collection recovery operation to be performed in a runtime state after end of abnormal situation using first and second operation logs; scanning a destination block to detect one or more valid pages during the garbage collection recovery operation; updating L2P mapping information of the detected valid pages, wherein the first operation log indicates a location of a valid page, into which source block data is most recently copied, in a destination block, and wherein the second operation log indicates a location of a valid page, L2P mapping information of which is most recently updated, in the destination block.

In accordance with various embodiments of the present invention, by performing garbage collection recovery operation after completion of booting process, the problem that booting process does not end in limited booting time may be prevented.

DETAILED DESCRIPTION

Figure 1:
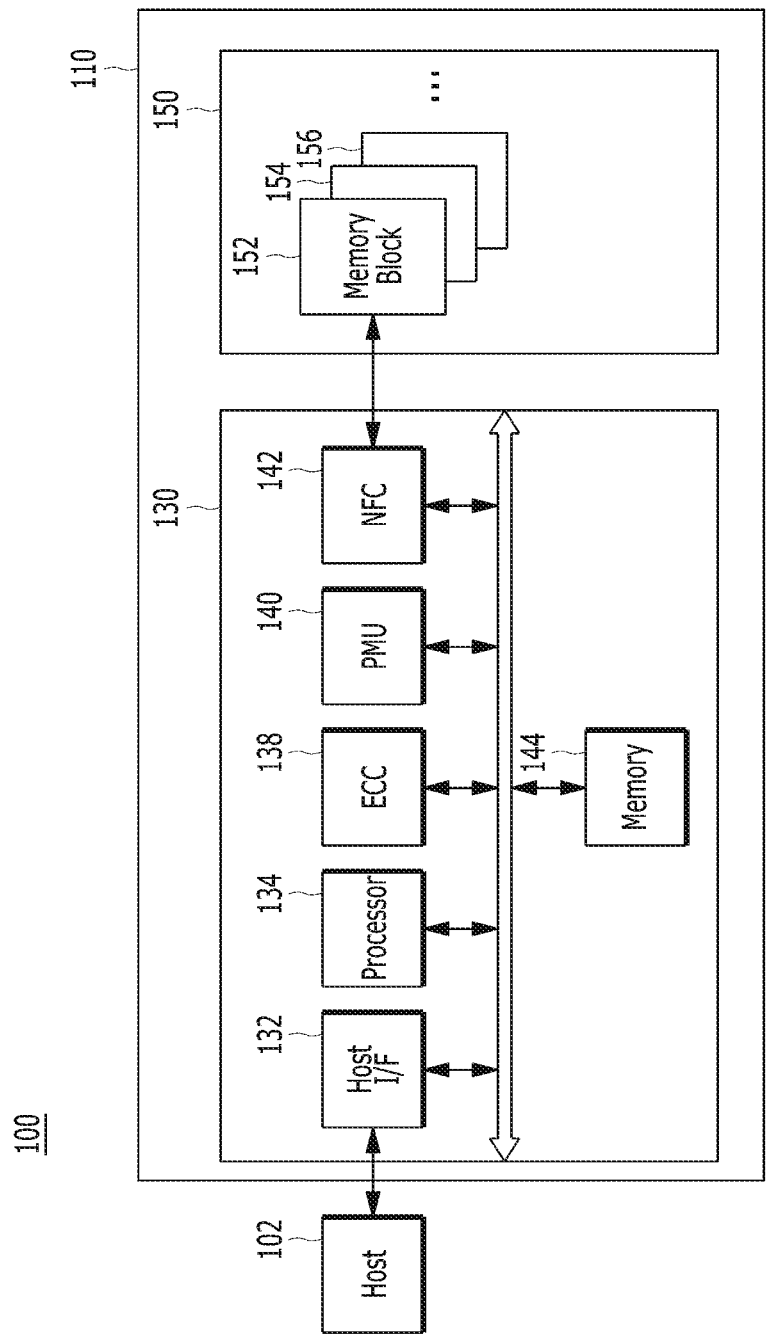
FIG. 1 is a block diagram illustrating a data processing system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include portable electronic devices such as a mobile phone, MP3 player and laptop computer or non-portable electronic devices such as a desktop computer, game machine, TV and projector.

The host 102 may include at least one OS (operating system), and the OS may manage and control overall functions and operations of the host 102, and provide an operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS configured to support a function of providing a mobile service to users and a power saving function of a system may include Android, iOS and Windows Mobile. At this time, the host 102 may include a plurality of OSs, and execute an OS to perform an operation corresponding to a user's request on the memory system 110.

The memory system 110 may operate to store data for the host 102 in response to a request of the host 102. Non-limited examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the. The SD card may include a mini-SD card and micro-SD card.

The memory system 110 may be embodied by various types of storage devices. Non-limited examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a memory device 150 and a controller 130. The memory device 150 may store data for the host 102, and the controller 130 may control data storage into the memory device 150.

The controller 130 and the memory device 150 may be integrated into a single semiconductor device, which may be included in the various types of memory systems as exemplified above. For example, the controller 130 and the memory device 150 may be integrated as one semiconductor device to constitute an SSD. When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a PCMCIA (personal computer memory card international association) card, CF card, SMC (smart media card), memory stick, MMC including RS-MMC and micro-MMC, SD card including mini-SD, micro-SD and SDHC, or UFS device.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory blocks 152 to 156, each of the memory blocks 152 to 156 may include a plurality of pages, and each of the pages may include a plurality of memory cells coupled to a word line. In an embodiment, the memory device 150 may be a flash memory. The flash memory may have a 3-dimensional (3D) stack structure.

Herein, since the structure of the memory device 150 and the 3D stack structure of the memory device 150 will be described in detail later with reference to FIGS. 2 to 4 and the memory device 150 including a plurality of memory dies, the memory dies each of which includes a plurality of planes, and the planes each of which includes a plurality of memory blocks 152, 154 and 156 will be described in detail later with reference to FIG. 6, further description on them will be omitted herein.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) unit 132, a controller processor 134, an error correction code (ECC) unit 138, a Power Management Unit (PMU) 140, a NAND flash controller (NFC) 142 and a controller memory 144 all operatively coupled via an internal bus.

The host interface unit 134 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may provide and manage power of the controller 130.

The NFC 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 and process data to be provided to the memory device 150 under the control of the controller processor 134. The NFC 142 may work as an interface (e.g., a NAND flash interface) for processing a command and data between the controller 130 and the memory device 150. Specifically, the NFC 142 may support data transfer between the controller 130 and the memory device 150.

The controller memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The controller memory 144 may store data required for the controller 130 and the memory device 150 to perform these operations.

The controller memory 144 may be embodied by a volatile memory. For example, the controller memory 144 may be embodied by static random access memory (SRAM) or dynamic random access memory (DRAM). The controller memory 144 may be disposed within or out of the controller 130. FIG. 1 exemplifies the controller memory 144 disposed within the controller 130. In an embodiment, the controller memory 144 may be embodied by an external volatile memory having a memory interface transferring data between the controller memory 144 and the controller 130.

The controller processor 134 may control the overall operations of the memory system 110. The controller processor 134 may drive firmware to control the overall operations of the memory system 110. The firmware may be referred to as flash translation layer (FTL). Also, the controller processor 134 may be realized as a microprocessor or a Central Processing Unit (CPU).

For example, the controller 130 may perform an operation requested by the host 102 in the memory device 150 through the controller processor 134, which is realized as a microprocessor or a CPU. In other words, the controller 130 may perform a command operation corresponding to a command received from the host 102. Herein, the controller 130 may perform a foreground operation as the command operation corresponding to the command received from the host 102. For example, the controller 130 may perform a program operation corresponding to a write command, a read operation corresponding to a read command, an erase operation corresponding to an erase command, and a parameter set operation corresponding to a set parameter command or a set feature command as a set command.

Also, the controller 130 may perform a background operation onto the memory device 150 through the controller processor 134, which is realized as a microprocessor or a CPU. Herein, the background operation performed onto the memory device 150 may include an operation of copying and processing data stored in some memory blocks among the memory blocks 152, 154 and 156 of the memory device 150 into other memory blocks, e.g., a garbage collection (GC) operation, an operation of performing swapping between the memory blocks 152, 154 and 156 of the memory device 150 or between the data of the memory blocks 152, 154 and 156, e.g., a wear-leveling (WL) operation, an operation of storing the map data stored in the controller 130 in the memory blocks 152, 154 and 156 of the memory device 150, e.g., a map flush operation, or an operation of managing bad blocks of the memory device 150, e.g., a bad block management operation of detecting and processing bad blocks among the memory blocks 152, 154 and 156 included in the memory device 150.

Also, in the memory system in accordance with the embodiment of the present invention, for example, the controller 130 may perform a plurality of command operations corresponding to a plurality of commands received from the host 102, e.g., a plurality of program operations corresponding to a plurality of write commands, a plurality of read operations corresponding to a plurality of read commands, and a plurality of erase operations corresponding to a plurality of erase commands, in the memory device 150, and update metadata, particularly, map data, according to the performance of the command operations.

In particular, in the memory system in accordance with the embodiment of the present invention, when the controller 130 performs command operations corresponding to a plurality of commands received from the host 102, e.g., program operations, read operations, and erase operations, in the memory blocks included in the memory device 150, the operation reliability of the memory device 150 may be deteriorated and also the utility efficiency of the memory device 150 may decrease because characteristics are deteriorated in the memory blocks due to the performance of the command operations. Therefore, a copy operation or a swap operation may be performed in the memory device 150 in consideration of the parameters for the memory device 150 according to the performance of the command operations.

For example, in the memory system in accordance with the embodiment of the present invention, when the controller 130 performs program operations corresponding to a plurality of write commands received from the host 102 in the memory blocks included in the memory device 150, the controller 130 may perform a copy operation, e.g., a garbage collection operation, onto the memory device 150 in order to improve the utility efficiency of the memory device 150 included in the memory system 110.

Also, in the memory system in accordance with the embodiment of the present invention, when the controller 130 performs erase operations corresponding to a plurality of erase commands received from the host 102 in the memory blocks included in the memory device 150, each of the memory blocks included in the memory device 150 may have a limited erase count, and accordingly, the controller 130 may perform erase operations corresponding to the erase commands within range of the limited erase count. For example, when the controller 130 performs erase operations onto particular memory blocks while exceeding the limited erase count, the particular memory blocks may processed as bad blocks, which may not be used any more. Herein, the limited erase count for the memory blocks of the memory device 150 may represent the maximal count that erase operations may be performed onto the memory blocks of the memory device 150. Therefore, in the memory system in accordance with the embodiment of the present invention, erase operations may be performed uniformly within the range of the limited erase count for the memory blocks of the memory device 150. Also, in order to secure operation reliability for the memory blocks of the memory device 150 from the erase operations, data may be processed with the memory blocks of the memory device 150 in consideration of the parameters of the memory blocks of the memory device 150, for example, a swap operation, e.g., a wear-leveling operation, may be performed in the memory device 150.

Also, in the memory system in accordance with the embodiment of the present invention, when the controller 130 performs read operations corresponding to a plurality of read commands received from the host 102 in the memory blocks included in the memory device 150, particularly, when the controller 130 repeatedly performs read operations in some particular memory blocks, read disturbance may be caused in the particular memory blocks due to the repeated read operations. Therefore, the controller 130 may perform a read reclaim operation to protect the particular memory blocks from losing data due to the read disturbance. In other words, in the memory system in accordance with the embodiment of the present invention, the controller 130 may copy and store the data stored in the particular memory blocks into other memory blocks through the read reclaim operation. In short, the controller 130 may perform a copy operation for the particular memory blocks in the memory device 150.

Herein, in the memory system in accordance with the embodiment of the present invention, the controller 130 may perform not only a swap operation and a copy operation but also a bad block management operation for some memory blocks in consideration of the parameters according to the performance of command operations corresponding to the commands received from the host 102, e.g., valid page counts (VPC) of the memory blocks of the memory device 150 according to the performance of program operations, erase counts according to the performance of erase operations, program counts according to the performance of program operations, and read counts according to the performance of read operations. Also, in the memory system in accordance with the embodiment of the present invention, the controller 130 may perform a copy operation, e.g., a garbage collection operation, onto the memory blocks of the memory device 150 in consideration of the parameters corresponding to not only the swap operation and the copy operation but also the bad block management operation that are performed in the memory blocks of the memory device 150. Herein, in the memory system in accordance with the embodiment of the present invention, since the performance of the command operations corresponding to a plurality of commands received from the host 102 and the performance of the swap operation and the copy operation performed in the memory device 150 in consideration of the parameters corresponding to the performance of the command operations will be described in detail later with reference to FIGS. 5 to 9, further description on it will be omitted herein.

The processor 134 of the controller 130 may include a management unit (not illustrated) for performing a bad management operation of the memory device 150. The management unit may perform a bad block management operation of checking a bad block, in which a program fail occurs due to a characteristic of the memory device, for example, a NAND flash memory during a program operation, among the plurality of memory blocks 152 to 156 included in the memory device 150. The management unit may write the program-failed data of the bad block to a new memory block. In a memory device 150 having a 3D stack structure, the bad block management operation may reduce the use efficiency of the memory device 150 and the reliability of the memory system 110. Thus, the bad block management operation needs to be performed with more reliability. Hereafter, the memory device of the memory system in accordance with the embodiment of the present invention is described in detail with reference to FIGS. 2 to 4.

Figure 2:
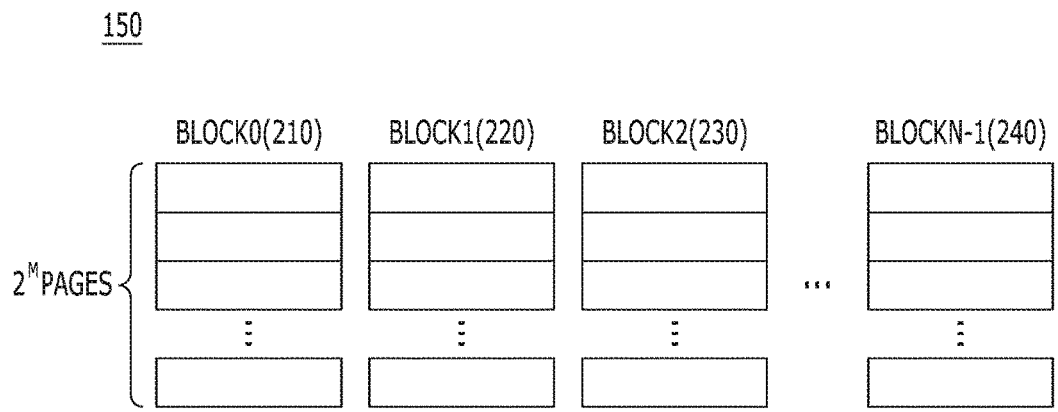
FIG. 2 is a schematic diagram illustrating an exemplary configuration of a memory device employed in a memory system of FIG. 1.
Figure 3:
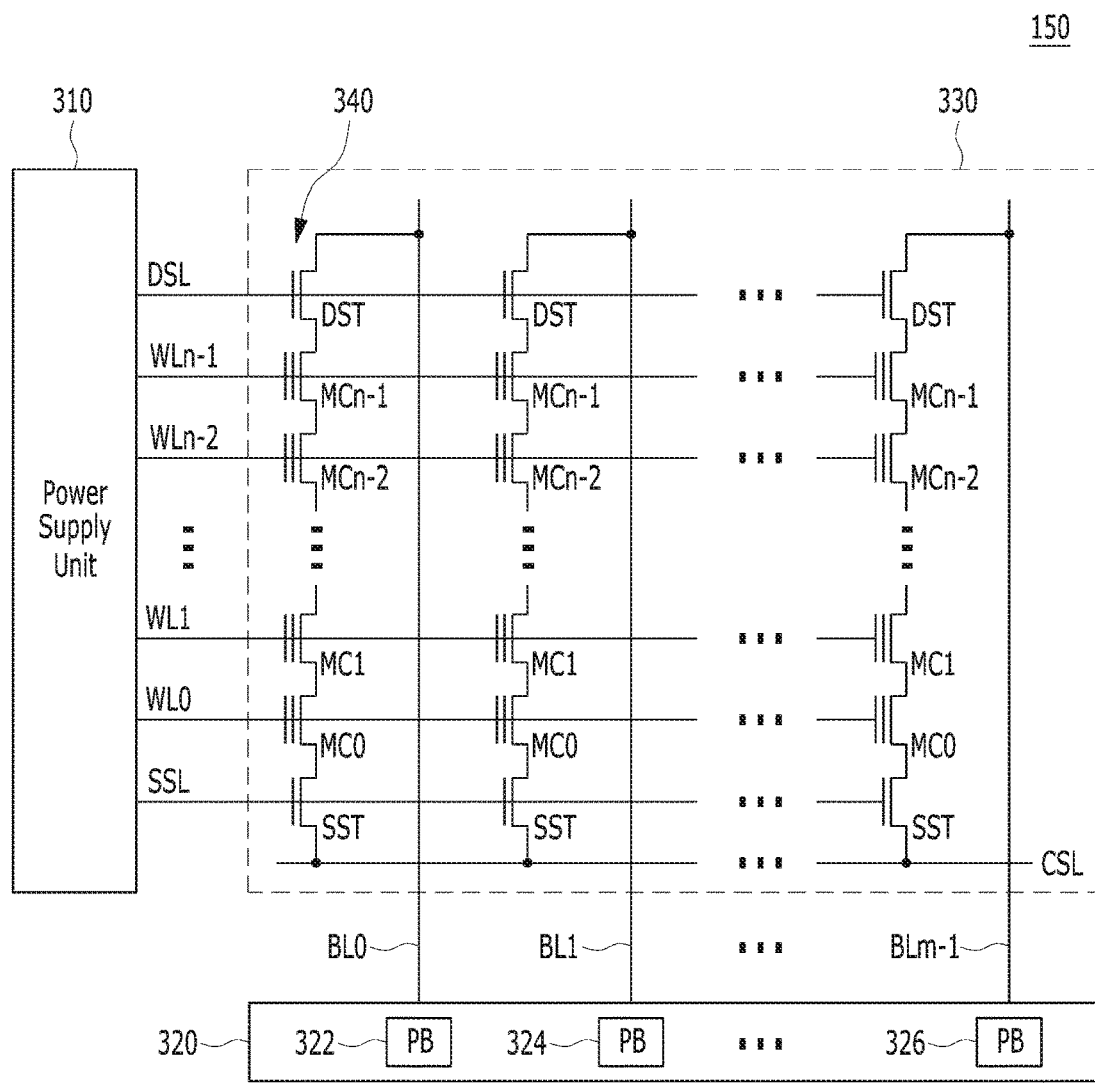
FIG. 3 is a circuit diagram illustrating an exemplary configuration of a memory cell array of a memory block in a memory device shown in FIG. 1.
Figure 4:
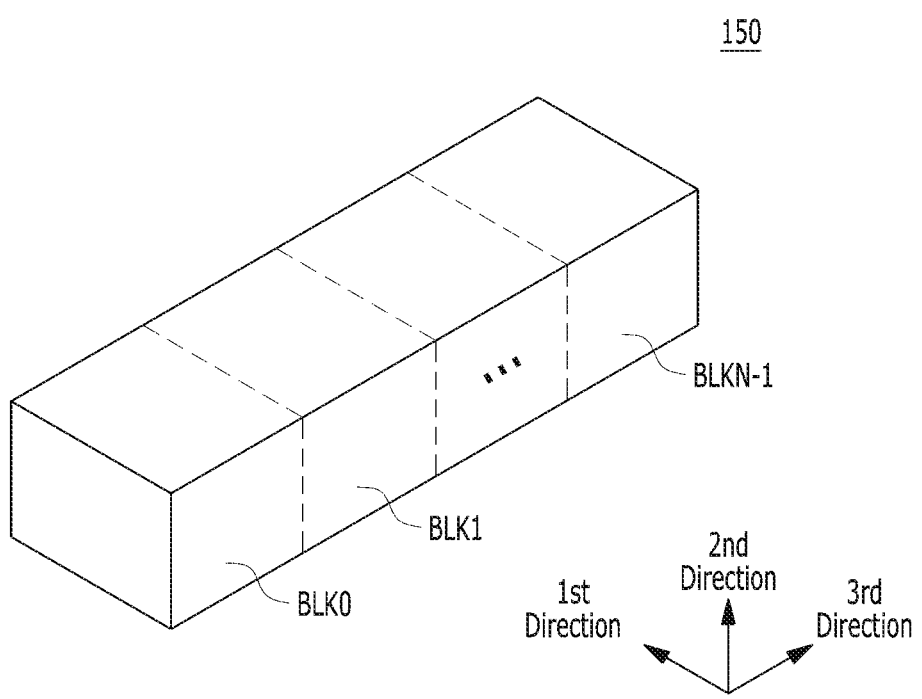
FIG. 4 is a block diagram illustrating a data processing system in accordance with an embodiment of the present invention.

FIG. 2 is a schematic diagram illustrating the memory device 150, FIG. 3 is a circuit diagram illustrating an exemplary configuration of a memory cell array of a memory block in the memory device 150 and FIG. 4 is a schematic diagram illustrating an exemplary 3D structure of the memory device 150.

Referring to FIG. 2, the memory device 150 may include a plurality of memory blocks 0 to N-1, e.g., a memory block 0 BLK0 210, a memory block 1 BLK1 220, a memory block 2 BLK2 230, and a memory block N-1 BLKN-1 240, and each of the memory blocks 210, 220, 230 and 240 may include a plurality of pages, for example, $2^M$ pages, the number of which may vary according to circuit design. Herein, although it is described for the sake of convenience in description that each of the memory blocks include $2^M$ pages, each of the memory blocks may include M pages as well. Each of the pages may include a plurality of memory cells that are coupled to a plurality of word lines WL.

Also, the memory device 150 may include a plurality of memory blocks, which may include a single level cell (SLC) memory block storing 1-bit data and/or a multi-level cell (MLC) memory block storing 2-bit data. Herein, the SLC memory blocks may include a plurality of pages that are realized by memory cells storing one-bit data in one memory cell. The SLC memory blocks may have a quick data operation performance and high durability. On the other hand, the MLC memory blocks may include a plurality of pages that are realized by memory cells storing multi-bit data, e.g., data of two or more bits, in one memory cell. The MLC memory blocks may have a greater data storing space than the SLC memory blocks. In other words, the MLC memory blocks may be highly integrated. Particularly, the memory device 150 may include not only the MLC memory blocks each of which includes a plurality of pages that are realized by memory cells capable of storing two-bit data in one memory cell, but also triple level cell (TLC) memory blocks each of which includes a plurality of pages that are realized by memory cells capable of storing three-bit data in one memory cell, quadruple level cell (QLC) memory blocks each of which includes a plurality of pages that are realized by memory cells capable of storing four-bit data in one memory cell, and/or multiple level cell memory blocks each of which includes a plurality of pages that are realized by memory cells capable of storing five or more-bit data in one memory cell, and so forth.

Herein, in accordance with the embodiment of the present invention, although it is described for the sake of convenience in description that the memory device 150 is a non-volatile memory, such as a flash memory, e.g., a NAND flash memory, the memory device 150 may be realized as one memory among a Phase Change Random Access Memory (PCRAM), a Resistive Random Access Memory (RRAM or ReRAM), a Ferroelectric Random Access Memory (FRAM), a Spin Transfer Torque Magnetic Random Access Memory (STT-RAM or STT-M RAM).

The memory blocks 210, 220, 230 and 240 may store the data transferred from the host 102 through a program operation, and transfer data stored therein to the host 102 through a read operation.

Subsequently, referring to FIG. 3, a memory block 330 which may correspond to any of the plurality of memory blocks 152 to 156 included in the memory device 150 of the memory system 110 may include a plurality of cell strings 340 coupled to a plurality of corresponding bit lines BL0 to BLm-1. The cell string 340 of each column may include one or more drain select transistors DST and one or more source select transistors SST. Between the drain and select transistors DST and SST, a plurality of memory cells MC0 to MCn-1 may be coupled in series. In an embodiment, each of the memory cell transistors MC0 to MCn-1 may be embodied by an MLC capable of storing data information of a plurality of bits. Each of the cell strings 340 may be electrically coupled to a corresponding bit line among the plurality of bit lines BL0 to BLm-1. For example, as illustrated in FIG. 3, the first cell string is coupled to the first bit line BL0, and the last cell string is coupled to the last bit line BLm-1.

Although FIG. 3 illustrates NAND flash memory cells, the invention is not limited in this way. It is noted that the memory cells may be NOR flash memory cells, or hybrid flash memory cells including two or more types of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

The memory device 150 may be embodied by a 2D or 3D memory device. Particularly, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN-1. Herein, FIG. 4 is a block diagram illustrating the memory blocks 152, 154 and 156 of the memory device 150 shown in FIG. 1. Each of the memory blocks 152, 154 and 156 may be realized in a 3D structure (or vertical structure). For example, the memory blocks 152, 154 and 156 may include structures of a three-dimensional structure that are extended in first to third directions, e.g., an x-axis direction, a y-axis direction, and a z-axis direction.

Each memory block 330 included in the memory device 150 may include a plurality of NAND strings NS that are extended in the second direction, and a plurality of NAND strings NS that are extended in the first direction and the third direction. Herein, each of the NAND strings NS may be coupled to a bit line BL, at least one string selection line SSL, at least one ground selection line GSL, a plurality of word lines WL, at least one dummy word line DWL, and a common source line CSL, and each of the NAND strings NS may include a plurality of transistor structures TS.

In short, each memory block 330 among the memory blocks 152, 154 and 156 of the memory device 150 may be coupled to a plurality of bit lines BL, a plurality of string selection lines SSL, a plurality of ground selection lines GSL, a plurality of word lines WL, a plurality of dummy word lines DWL, and a plurality of common source lines CSL, and each memory block 330 may include a plurality of NAND strings NS. Also, in each memory block 330, one bit line BL may be coupled to a plurality of NAND strings NS to realize a plurality of transistors in one NAND string NS. Also, a string selection transistor SST of each NAND string NS may be coupled to a corresponding bit line BL, and a ground selection transistor GST of each NAND string NS may be coupled to a common source line CSL. Herein, memory cells MC may be provided between the string selection transistor SST and the ground selection transistor GST of each NAND string NS. In other words, a plurality of memory cells may be realized in each memory block 330 of the memory blocks 152, 154 and 156 of the memory device 150.

Figure 5:
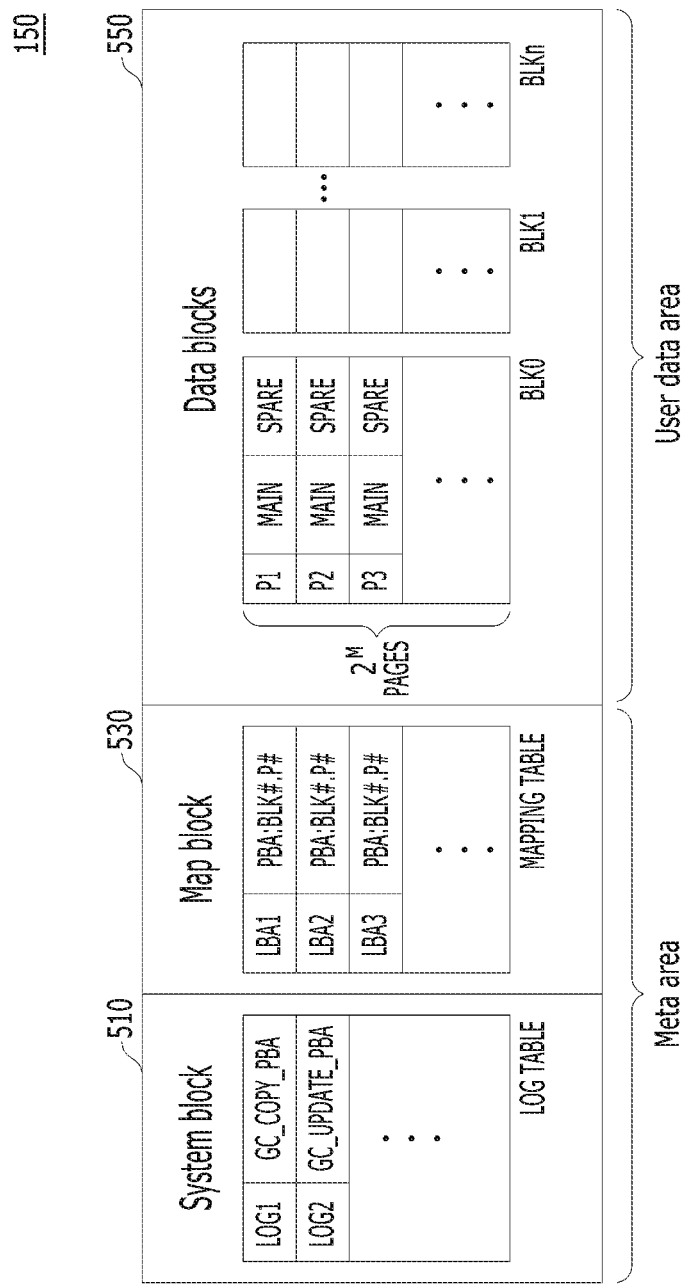
FIG. 5 is a block diagram illustrating memory device in accordance with an embodiment of the present invention.

FIG. 5 is a block diagram illustrating the memory device 150 in accordance with an embodiment of the present invention.

The memory device 150 may include meta-area that stores meta-information and user data area that stores user data information. The meta-area may include a system block 510 and a map block 530, and the user area may include the data blocks 550.

The system block 510 may store plural operation record (hereinafter, referred to as an operation log) of the controller 130 in a form of a table. In accordance with an embodiment of the present invention, the plural operation logs may include a first operation log and a second operation log. The first operation log may indicate the location of valid page, into which source block data are most recently copied, in a destination block. The second operation log may indicate the location of valid page, L2P mapping information of which is most recently updated, in a destination block.

The map block 530 may store L2P mapping information for valid page of the plural data blocks 550 in a form of a table.

The data blocks 550 may include plural pages and each page may include main area where user data are stored and spare area where additional data (e.g., page information for a page) are stored. The page information may be logical address corresponding to physical address of a page.

For reference, with garbage collection recovery operation, source blocks may be one or more data blocks that include the most large number of invalid page among plural data blocks 550, and destination block may be one data block that only includes empty page among plural data blocks 550.

Figure 6:
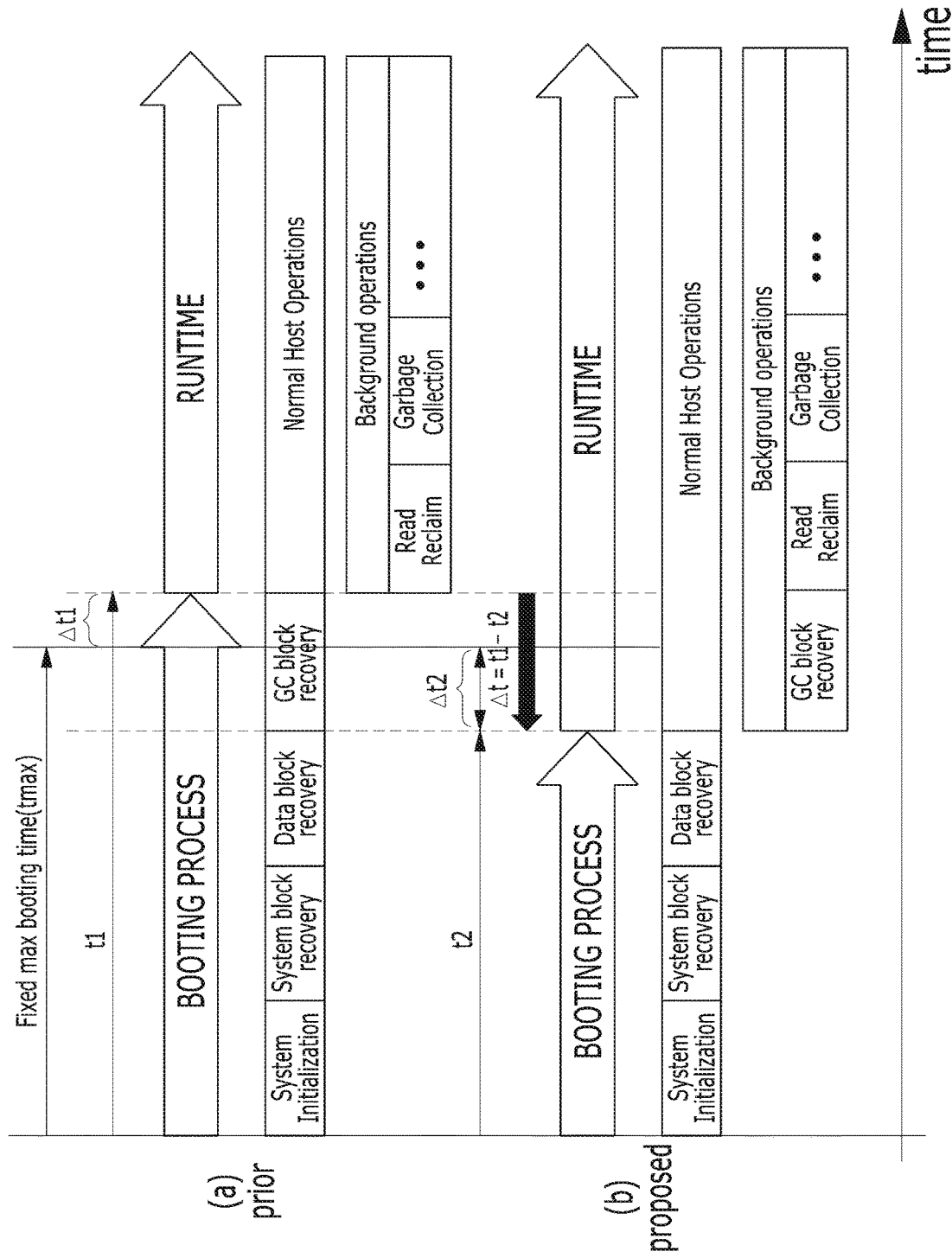
FIG. 6 is a diagram illustrating garbage collection recovery operation time in accordance with an embodiment of the present invention.
Figure 7A:
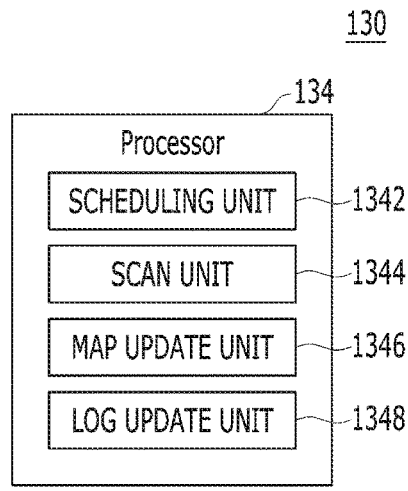
FIG. 7A is a diagram illustrating composition of processor which performs garbage collection recovery operation in accordance with an embodiment of the present invention.
Figure 7B:
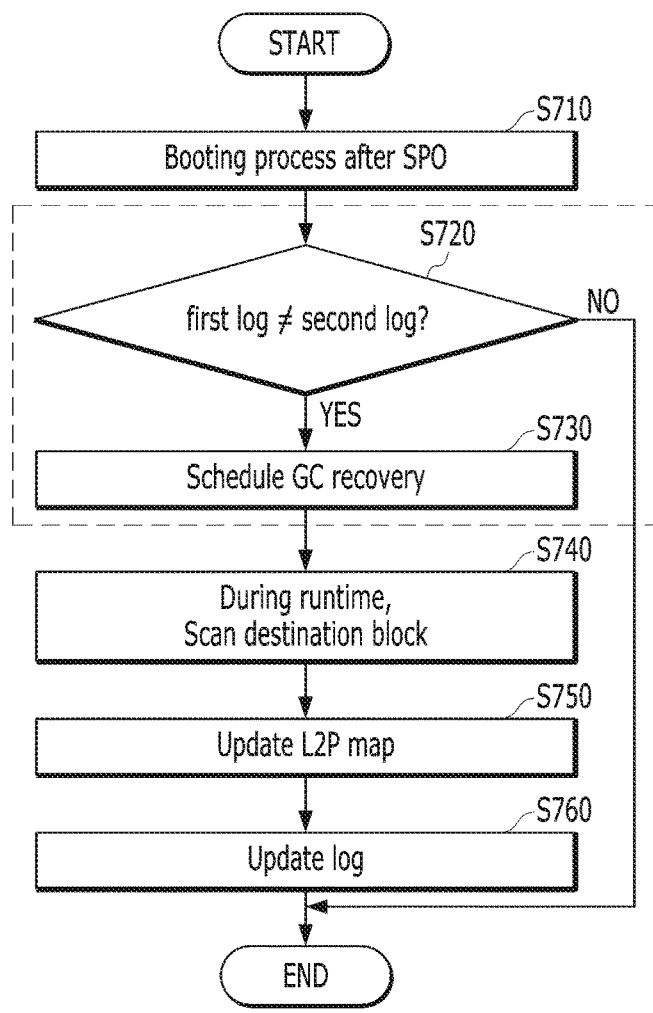
FIG. 7B is a flow chart describing garbage collection recovery operation in accordance with an embodiment of the present invention.

Hereafter, referring to FIG. 6 to FIG. 7B, garbage collection recovery operation may be provided in detail in accordance with an embodiment of the present invention.

FIG. 6 is a diagram illustrating a time point of a garbage collection recovery operation in accordance with an embodiment of the present invention.

The memory device 150 may perform a garbage collection recovery operation controlled by the controller 130 when garbage collection operation ends due to occurrence of abnormal situation like abnormal end of the memory system 110.

In accordance with an embodiment of the present invention, the abnormal situation may include sudden power off (SPO). For example, a SPO may occur when external power supply stops due to unexpected power error.

The occurrence of a SPO may be detected by comparing voltage level by the PMU 140. In detail, the PMU 140 may compare voltage applied to the memory system 110 and a predetermined threshold voltage. The PMU 140 may determine SPO as having occurred when the voltage applied to the memory system 110 is lower than the threshold voltage.

After power on after a SPO, the memory system 110 may be ready to respond to input/output commands provided from the host 102 after a booting process.

According to the prior art, the booting process after a SPO may include a data block recovery operation and a garbage collection recovery operation.

L2P mapping information for valid page may not be generated if SPO occurred while user data are written. The memory system 110 cannot respond to input/output commands for the data without L2P mapping information. Therefore, an operation of generating L2P mapping information of the data blocks 550 after SPO, namely, a recovery operation for the data blocks 550 must be performed during the booting process.

Meanwhile, in the mapping table 530, L2P mapping information for all or part of valid pages in a destination block, into which source block data are copied, may not be updated when SPO occurs during a garbage collection operation. In this case, L2P mapping information for all or part of valid page of valid page of source block may be kept stored the mapping table 530 and the data corresponding to the L2P mapping information may be still validly stored in the source blocks. As a result, the memory system 110 may perform responsive operations to the source blocks in response to the input/output commands for copied data. Therefore, after occurrence of a SPO, a garbage collection recovery operation of updating L2P mapping information from physical addresses of the source blocks to a physical address of a destination block may not be inevitably performed during the booting process.

The memory system 110 may have a limited booting time. Since the memory system 110 performs a rebooting operation repeatedly if a booting process is not completed during the limited booting time, entering into runtime state may be delayed.

A garbage collection recovery operation included in the booting process may increase booting time and cause the repetition of the rebooting operation. For example, it may take much time for the booting process if L2P mapping information for all of valid page of a destination block are updated during a garbage collection recovery operation, and therefore the booting process may not be normally completed when the booting process is not completed during the limited booting time.

To solve the above described problem, a garbage collection operation may be performed as a background operation in a runtime state after occurrence of SPO. Namely, a booting process may include a recovery operation for the data blocks 550 while a garbage collection operation may be performed as a background operation in runtime state after the booting process. Therefore, the booting time may decrease and the memory system 110 may complete the booting process within a limited booting time. Namely, rapid storage service may be possible.

Meanwhile, if a garbage collection recovery operation is delayed in a runtime state, it may be hard to obtain free blocks since valid pages of source blocks are not erased, and in worst case, the memory system 110 may fall into run-out of spare (ROS) state, in which no free block can be obtained.

Therefore, a garbage collection recovery operation may be performed in a runtime state as a background operation of the highest priority among all background operations. In this case, the memory system 110 may rapidly obtain a free block and prevent fall into the ROS state by erasing valid page of source blocks after completing a garbage collection recovery operation.

In FIG. 6, (a) illustrates the prior art that a garbage collection recovery operation is performed during booting process, and (b) illustrates an embodiment of the present invention that a garbage collection recovery operation is performed as a priority background operation in a runtime state.

According to the prior art illustrated in (a) of FIG. 6, the required booting time (denoted as "t1" in FIG. 6) excesses the limited booting time (denoted as "fixed max booting time (tmax)" in FIG. 6) by an amount of "Δt1" since the garbage collection operation is included in the booting process. In this case, the memory system 110 may not complete the booting process during the limited booting time and rebooting may be repeated.

However, according to an embodiment of the present invention (b) of FIG. 6, a required booting time (denoted as "t2" in FIG. 6) is decreased by an amount of "Δt2", compared with the limited booting time (i.e., "tmax"), since the garbage collection recovery operation is excluded from the booting process. In this case, the memory system 110 may complete the booting process within the limited booting time.

In accordance with an embodiment of the present invention, the required booting time decreases by an amount of "at (=Δt1+Δt2=t1−t2)", compared with the prior art, so that the memory system 110 may complete the booting process within the limited booting time.

Furthermore, according to an embodiment of the present invention (b) of FIG. 6, a garbage collection recovery operation may be performed as a background operation, in a runtime state, and first among background operations.

FIG. 7A is a diagram illustrating the processor 134 in accordance with an embodiment of the present invention, and FIG. 7B is a flow chart describing a garbage collection recovery operation in accordance with an embodiment of the present invention.

Referring to FIG. 7A, the processor 134 may include a scheduling unit 1342, a scanning unit 1344, a map updating unit 1346 and a log updating unit 1348.

Referring to FIG. 7B, in step S710, the processor 134 may perform a booting operation when powered on after SPO occurrence in the memory system 110. The booting process may include system initialization operation, system block recovery operation, and data block recovery operation.

In steps S720 and S730, the scheduling unit 1342 may schedule whether a garbage collection recovery operation is performed or not and a start time point of a garbage collection recovery operation during the booting process after occurrence of SPO.

As mentioned by referring FIG. 5, the first operation log of the system block 510 may indicate the location of valid page, into which source block data are most recently copied, in a destination block, and the second operation log may indicate the location of valid page, L2P mapping information of which is most recently updated, in a destination block. If the destination block has a valid page, L2P mapping information of which is not yet updated, the first operation log and the second operation log may be different for the valid page.

Therefore, when the first operation log and the second are different from each other ("YES" in step S720), the scheduling unit 1342 may decide to perform a garbage collection recovery operation.

In step S730, the scheduling unit 1342 may schedule so that the garbage collection recovery operation is performed with highest priority among background operations in run-time state.

In step S720, if the first operation log and the second operation log are the same as each other ("NO"), the scheduling unit 1342 may decide not to perform a garbage collection recovery operation.

In step S740, the scanning unit 1344 may scan the destination block to detect a valid page, L2P mapping information of which is not updated, by using the second operation log when the scheduled a garbage collection recovery operation starts.

The second operation log having a null value may represent no update of the L2P mapping information of a corresponding valid page in the destination block. The scanning unit 1344 may scan the destination block in order from a valid page, into which data are copied at first. In this case, the scanning unit 1344 may detect a valid page, the second operation log corresponding to which has a null value.

The second operation log having a non-null value, which is different from a value of the first operation log, may represent partial update of the L2P mapping information of a corresponding valid page in the destination block. The scanning unit 1344 may scan the destination block in order from a valid page, into which data are copied after a valid page, L2P mapping information of which is lastly updated, and which may be identified through the second operation log. In this case, the scanning unit 1344 may detect a valid page, the second operation log corresponding to which has a non-null value different from a value of the first operation log.

In step S750, the map updating unit 1346 may update L2P mapping information of the mapping table stored in the map block 530 for the valid page, which is detected while scanning the destination block in step S740, using each of page information.

When the map update operation of step S750 is completed, L2P mapping information of valid pages in the destination block are all updated and therefore the location (corresponding to the value of the first operation log) of the valid page, into which data are most recently copied, and the location (corresponding to the value of the second operation log) of the valid page, L2P mapping information of which is most recently updated, in destination block are the same as each other.

In step 760, the log updating unit 1348 may update the second operation log so that the updated operation log has same value as the first operation log.

A garbage collection recovery operation in accordance with an embodiment of the present invention may end when operation of the scheduling unit 1342 in step S720 through the log updating unit 1348 in step S760 is done.

Figure 8:
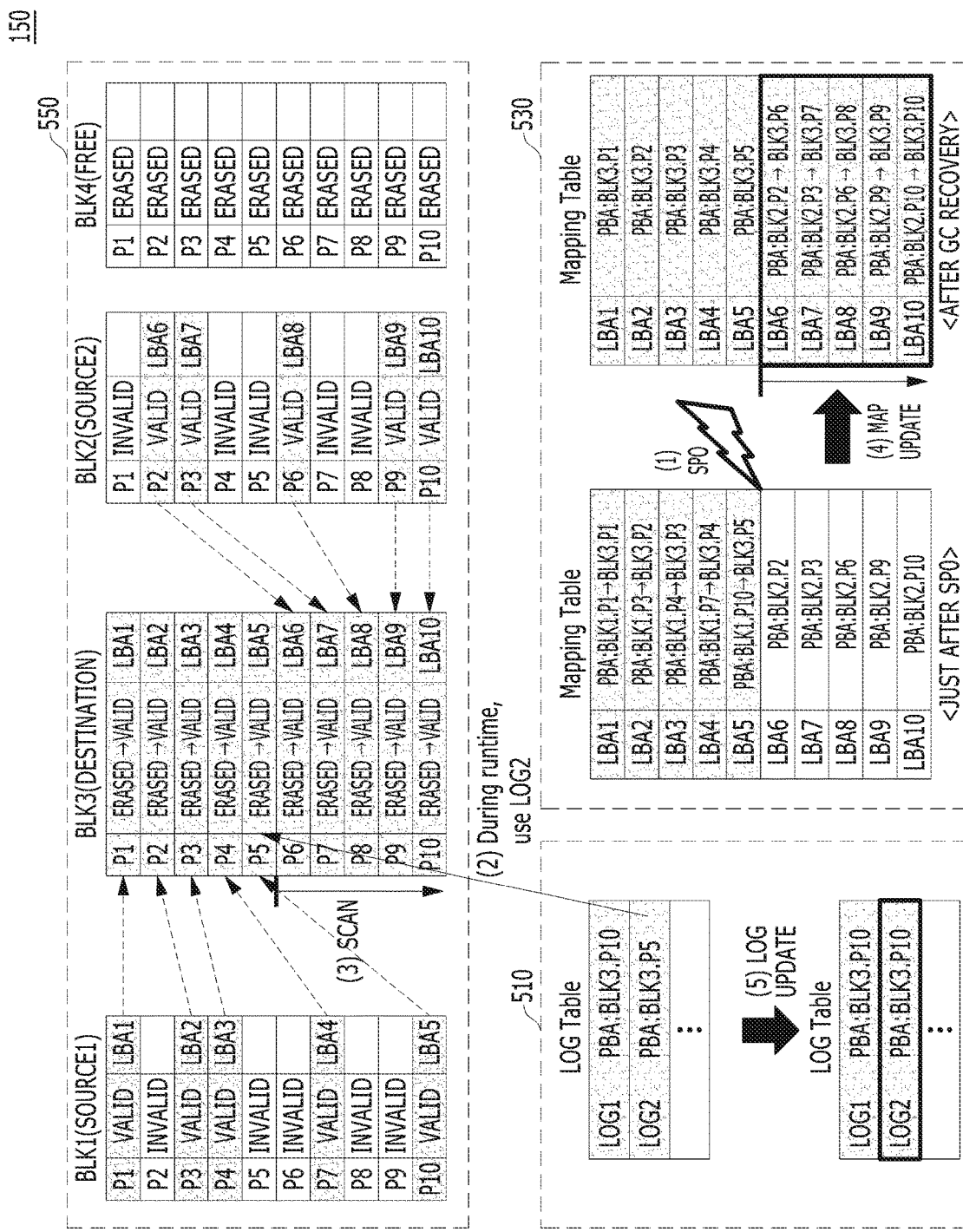
FIG. 8 is a diagram illustrating a specific example of garbage collection recovery operation in accordance with an embodiment of the present invention.

Hereafter, specific example of a garbage collection recovery operation in accordance with an embodiment of the present invention is provided referring to FIG. 8.

FIG. 8 illustrates a single system block including a log table 510, a single map block including the mapping table 530, and the memory device 150 including 4 data blocks each having 10 pages.

As exemplified in FIG. 8, data stored in total of 10 valid pages comprising 5 valid pages P1, P3, P4, P7 and P10 in the first block BLK1 and 5 valid pages P2, P3, P6, P9 and P10 in the second block BLK2 may be copied from those source blocks BLK1 and BLK2 sequentially to the first to tenth pages P<1:10> of the third block BLK3 as a destination block.

The location of the valid pages, into which the data of the source blocks are recently copied, in the destination block before occurrence of SPO. For example, the physical address (denoted as "BLK3.P10" in FIG. 8) of tenth page P10 of the third block BLK3 may be stored as the first operation log LOG1.

It is taken as an example that L2P mapping information for the first to fifth pages of the destination block BLK3 are updated into the mapping table 530 by a garbage collection operation performed before the occurrence of SPO.

Specifically, a physical address corresponding to a first logical address LBA1 may be updated from the first page of the first block (denoted as "BLK1.P1" in FIG. 8) to the first page of the third block (denoted as "BLK3.P1" in FIG. 8) in the mapping table 530.

In similar way, a physical address corresponding to a second logical address LBA2 may be updated from the third page of the first block (denoted as "BLK1.P3" in FIG. 8) to the second page of the third block (denoted as "BLK3.P2" in FIG. 8) in the mapping table 530. Further, physical addresses corresponding to third to fifth logical addresses LBA3 to LBA5 may be sequentially updated.

The location of the valid page, mapping information of which is most recently updated, in destination block (i.e., the physical address (BLK3.P5) of the fifth page of the third block BLK3) may be stored as the second operation log LOG2 before the occurrence of SPO.

FIG. 8 illustrates an example of the occurrence of SPO right after L2P mapping information for the fifth page of the third block BLK3 (i.e., the destination block) and the second operation log are updated.

The booting process may be performed when power is on after the occurrence of SPO. The scheduling unit 1342 may determine whether to perform a garbage collection recovery operation and a start time point of the garbage collection recovery operation during the booting process.

Specifically, referring to FIG. 8, since the first operation log ("PBA: BLK3.P10"), and the second operation log ("PBA: BLK3.P5") have different physical addresses, the scheduling unit 1342 may determine to perform a garbage collection recovery operation with highest priority among back ground operations in a runtime state.

The scanning unit 1344 may scan the destination block BLK3 to detect a valid page, L2P mapping information of which is not yet updated, using the second long LOG2 when the scheduled garbage collection recovery operation performance starts.

Specifically, referring to FIG. 8, the second log scanning unit 1344 may scan the destination block BLK3 in order from the sixth page, into which data is copied after the fifth page since the second operation log indicates the physical address (BLK3.P5) of the fifth page of the third block. In this case, the sixth to tenth pages P<6:10> may be scanned in order.

The map updating unit 1346 may update L2P mapping information of the mapping table 530 for the detected valid page using page information of the detected valid page.

Specifically, referring to FIG. 8, physical address corresponding to the sixth logical address LBA6 in the mapping table 530 may be updated from the second page of the second block (PBA:BLK2.P2) to the third page of the third block (PBA:BLK2.P3). In the similar way, physical addresses corresponding to the seventh to tenth logical addresses LBA7 to LBA10 may be updated from pages P2, P3, P6, P9 and P10 of the second block BLK2 (i.e., the source block) to pages P6, P7, P8, P9 and P10 of the third block BLK3 (i.e., the destination block).

The log updating unit 1348 may update the second operation log to have the same value as the first operation log.

Specifically, referring to FIG. 8, the second operation log has same value as the first operation log (PBA: BLK3.P10) since the second operation log is updated to physical address of the tenth page of the third block (PBA: BLK3.P10), L2P mapping information of which is most recently updated by the garbage collection recovery operation.

As described above, the mapping table 530 may include L2P mapping information for all valid pages of the destination block BLK3 when a garbage collection recovery operation in accordance with an embodiment of the present invention is all done.

Accordance to the method of controller operation in accordance with an embodiment of the present invention, the problem that memory system is not completed during limited booting time may be prevented by performing a garbage collection recovery operation as a background operation with a highest priority in runtime state when SPO occurs during garbage collection operation.

Therefore, the problem of storage service provision latency and occurrence of ROS situation in memory system in accordance with an embodiment of the present invention may be improved. Hereinafter, a data processing system and electronic devices to which the memory system 110 including the memory device 150 and the controller 130, which are described above by referring to FIGS. 1 to 8, in accordance with the embodiment of the present invention will be described in detail with reference to FIGS. 9 to 17.

Figure 9:
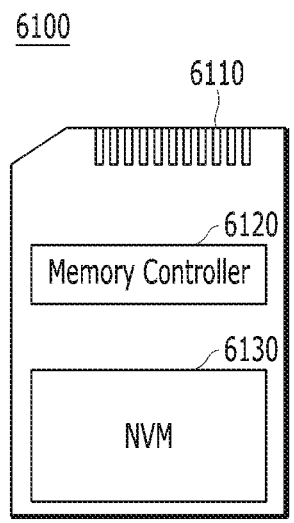
FIGS. 9 to 17 are diagrams schematically illustrating application examples of the data processing system, in accordance with various embodiments of the present invention.

FIG. 9 is a diagram schematically illustrating another example of the data processing system including the memory system in accordance with the present embodiment. FIG. 9 schematically illustrates a memory card system to which the memory system in accordance with the present embodiment is applied.

Referring to FIG. 9, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, the memory controller 6120 may include a RAM, a processing unit, a host interface, a memory interface and an error correction unit.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device. For example, the memory controller 6120 and the memory device 6130 may construct a solid-state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 10:
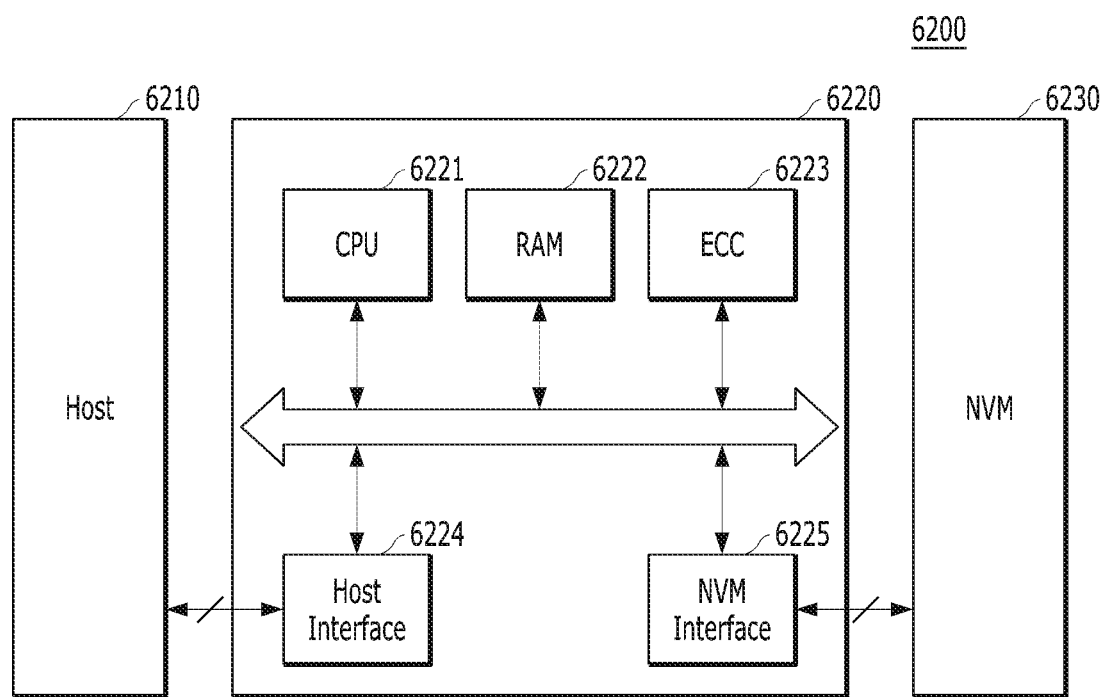

FIG. 10 is a diagram schematically illustrating another example of the data processing system including the memory system in accordance with the present embodiment.

Referring to FIG. 10, the data processing system 6200 may include a memory device 6230 having one or more nonvolatile memories and a memory controller 6220 for controlling the memory device 6230. The data processing system 6200 illustrated in FIG. 10 may serve as a storage medium such as a memory card (CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 11:
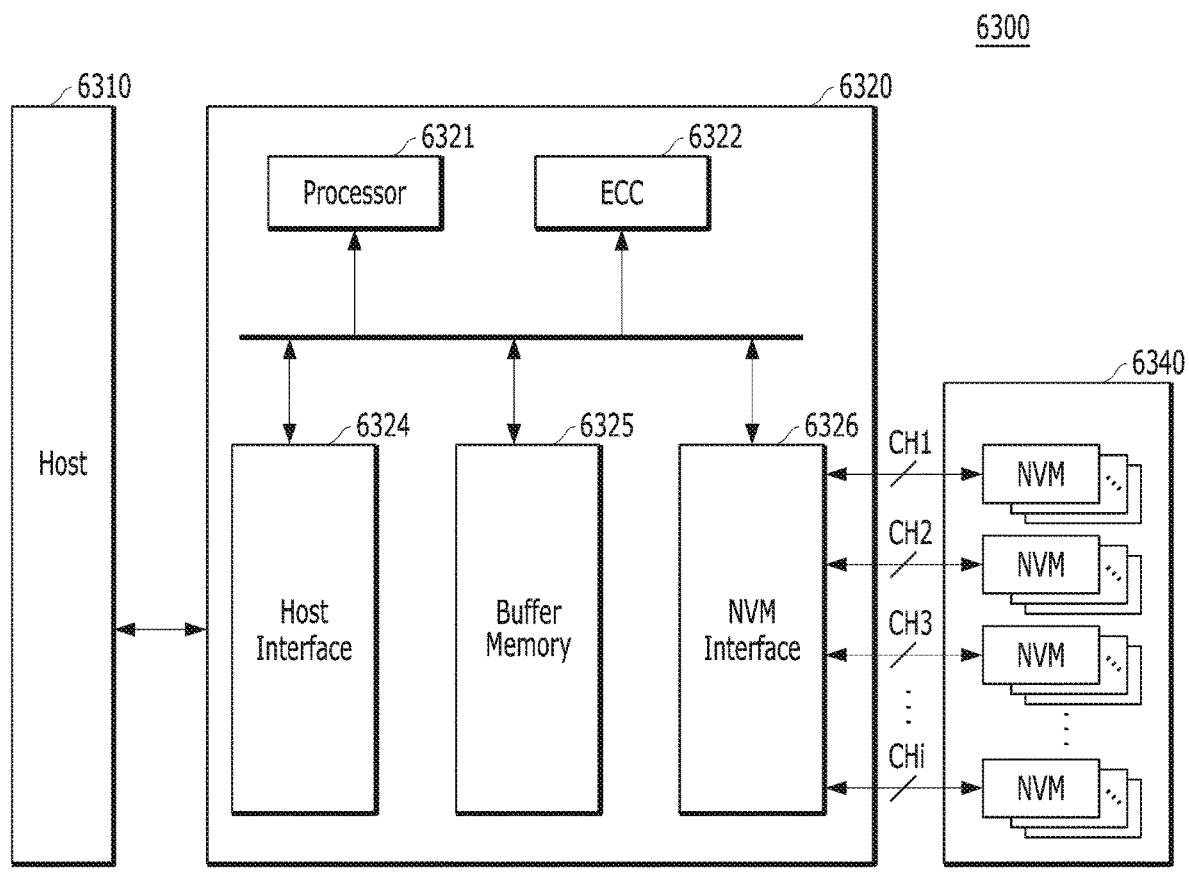

FIG. 11 is a diagram schematically illustrating another example of the data processing system including the memory system in accordance with the present embodiment. FIG. 11 schematically illustrates an SSD to which the memory system in accordance with the present embodiment is applied.

Referring to FIG. 11, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta-data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 8 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 12:
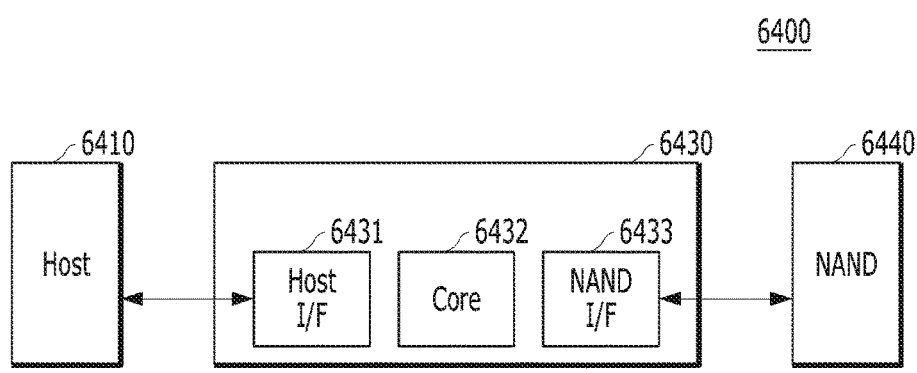

FIG. 12 is a diagram schematically illustrating another example of the data processing system including the memory system in accordance with the present embodiment. FIG. 12 schematically illustrates an embedded Multi-Media Card (eMMC) to which the memory system in accordance with the present embodiment is applied.

Referring to FIG. 12, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 13 to 16 are diagrams schematically illustrating other examples of the data processing system including the memory system in accordance with the present embodiment. FIGS. 13 to 16 schematically illustrate UFS (Universal Flash Storage) systems to which the memory system in accordance with the present embodiment is applied.

Referring to FIGS. 13 to 16, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 10 to 12, and the UFS cards 6530, 6630, 6730 and 6830 may be embodied in the form of the memory card system 6100 described with reference to FIG. 9.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 13:
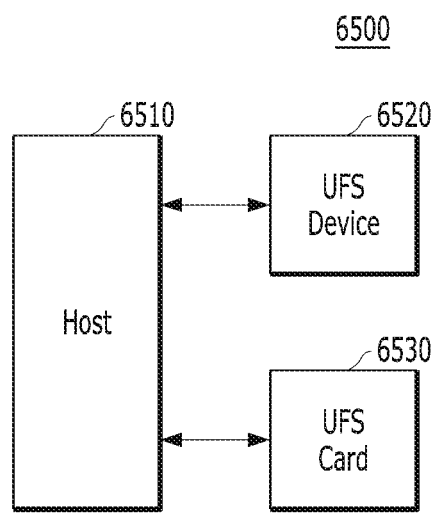

In the UFS system 6500 illustrated in FIG. 13, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 14:
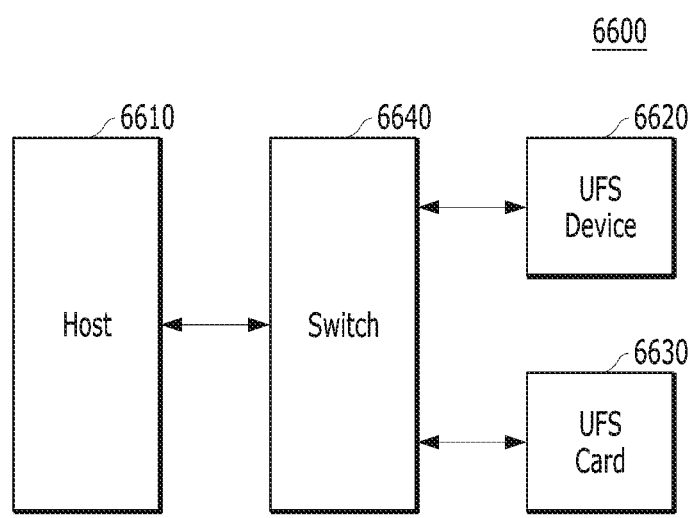

In the UFS system 6600 illustrated in FIG. 14, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 15:
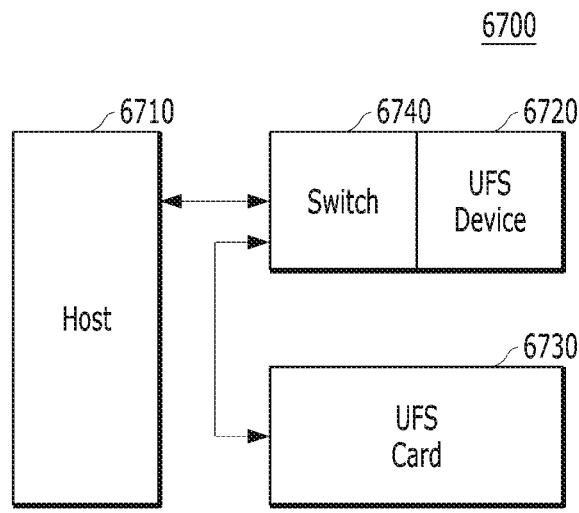

In the UFS system 6700 illustrated in FIG. 15, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 16:
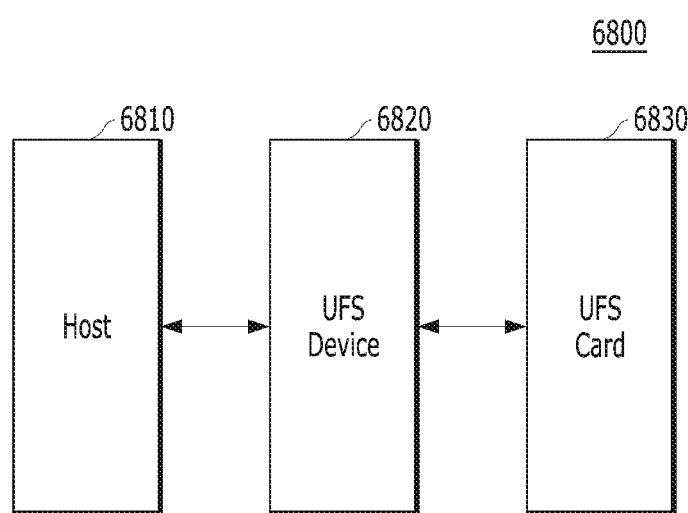

In the UFS system 6800 illustrated in FIG. 16, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 17:
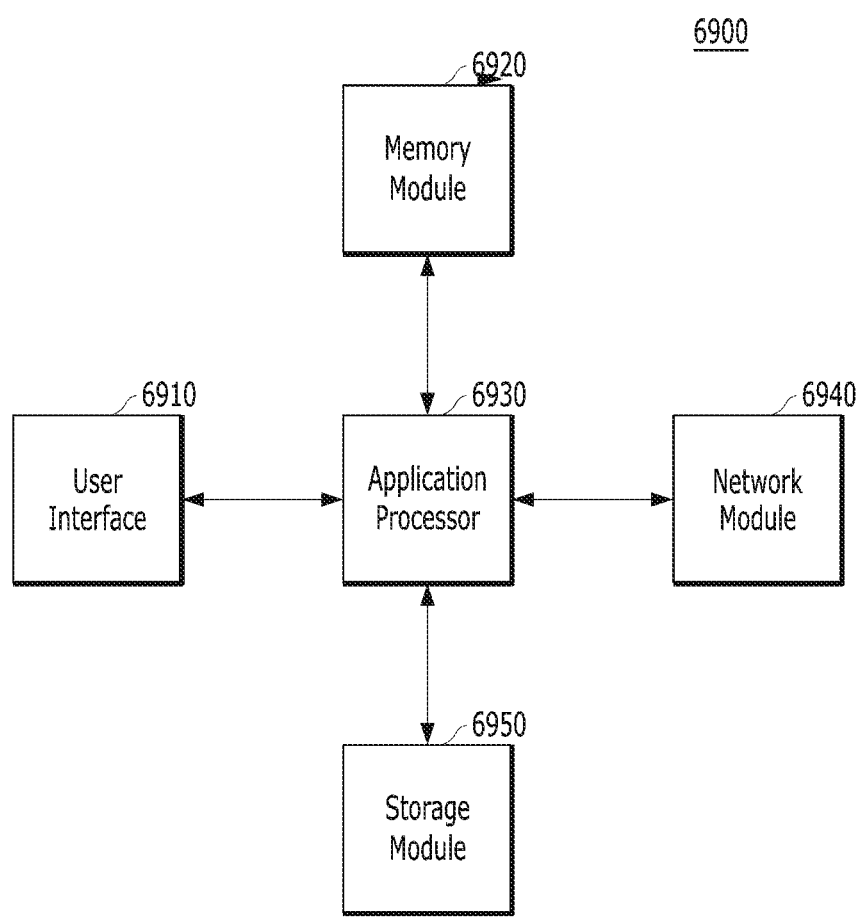

FIG. 17 is a diagram schematically illustrating another example of the data processing system including the memory system in accordance with an embodiment. FIG. 17 is a diagram schematically illustrating a user system to which the memory system in accordance with the present embodiment is applied.

Referring to FIG. 17, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

According to the embodiments of the present invention, a memory system is capable of processing data with a memory device quickly and stably by minimizing the complexity and performance deterioration of the memory system and maximizing the utility efficiency of the memory device, and a method for operating the memory system.

While the present invention has been described with respect to the specific embodiments, it will be apparent to those skilled in the art that various changes and modifications may be made without departing from the spirit and scope of the invention as defined in the following claims.

What is claimed is:

1. A controller comprising:
a scheduling unit suitable for scheduling a garbage collection recovery operation to be performed in a runtime state after end of abnormal situation using first and second operation logs;
a scanning unit suitable for scanning a destination block to detect one or more valid pages during the garbage collection recovery operation; and
a map updating unit suitable for updating logical-to-physical mapping information of the detected valid pages,
wherein the first operation log indicates a location of a valid page, into which source block data is most recently copied, in a destination block, and
wherein the second operation log indicates a location of a valid page, logical-to-physical mapping information of which is most recently updated, in the destination block.

2. The controller of claim 1, wherein the controller further includes a log update unit suitable for updating the second operation log when the update of logical-to-physical mapping information is completed.

3. The controller of claim 1, wherein the scheduling unit schedules the garbage collection recovery operation to be performed with the highest priority in a runtime state.

4. The controller of claim 1, wherein the scanning unit scans the destination block to detect the valid pages using the second operation log.

5. The controller of claim 1, wherein the first operation log and the second operation log are stored in a system block of a memory device.

6. The controller of claim 1, wherein the logical-to-physical mapping information is stored in a map block of a memory device.

7. The controller of claim 1, wherein the location of the valid page is a physical address of the valid page.

8. The controller of claim 1, wherein the abnormal situation is a sudden power off of a memory system including the controller.

9. The controller of claim 8, wherein the sudden power off is detected by comparing voltage level by a power management unit.

10. A method for operating a controller, the method comprising:
scheduling a garbage collection recovery operation to be performed in a runtime state after end of abnormal situation using first and second operation logs;
scanning a destination block to detect one or more valid pages during the garbage collection recovery operation;
updating logical-to-physical mapping information of the detected valid pages,
wherein the first operation log indicates a location of a valid page, into which source block data is most recently copied, in a destination block, and
wherein the second operation log indicates a location of a valid page, logical-to-physical mapping information of which is most recently updated, in the destination block.

11. The method of claim 10, further comprising updating the second operation log when the update of logical-to-physical mapping information is completed.

12. The method of claim 10, wherein the scheduling includes scheduling the garbage collection recovery operation to be performed with the highest priority in a runtime state.

13. The method of claim 10, wherein the scanning is performed using the second operation log.

14. The method of claim 10, wherein the first operation log and the second operation log are stored in a system block of a memory device.

15. The method of claim 10, wherein the logical-to-physical mapping information is stored in a map block of a memory device.

16. The method of claim 10, wherein the location of the valid page is a physical address of the valid page.

17. The method of claim 10, wherein the abnormal situation is a sudden power off of a memory system including the controller.

18. The method of claim 17, wherein the sudden power off is detected by comparing voltage level by a power management unit.

19. A memory system comprising:
a memory device; and
a controller,
wherein the controller includes:
a scheduling unit suitable for scheduling a garbage collection recovery operation to be performed in a runtime state after end of abnormal situation using first and second operation logs;
a scanning unit suitable for scanning a destination block to detect one or more valid pages during the garbage collection recovery operation; and
a map updating unit suitable for updating logical-to-physical mapping information of the detected valid pages,
wherein the first operation log indicates a location of a valid page, into which source block data is most recently copied, in a destination block, and
wherein the second operation log indicates a location of a valid page, logical-to-physical mapping information of which is most recently updated, in the destination block.

20. The memory system of claim 19, wherein the scheduling unit schedules the garbage collection recovery operation to be performed with the highest priority in a runtime state.

21. A memory system comprising:
a memory device suitable for storing first and second operation logs and logical-to-physical mapping information of memory blocks included therein; and
a controller suitable for controlling, after completion of a booting process thereof, the memory device to perform a garbage collection recovery operation with the highest priority based on the first and second operation logs and the logical-to-physical mapping information,
wherein the first operation log indicates a location of a valid page, into which source block data is most recently copied, in a destination block, and
wherein the second operation log indicates a location of a valid page, the logical-to-physical mapping information of which is most recently updated, in the destination block.

* * * * *